United States Patent [19]
Gillemot

[11] 3,937,550
[45] Feb. 10, 1976

[54] SNAP-IN, SNAP-OUT TERMINAL BLOCK AND MOUNTING MEMBER THEREFOR

[75] Inventor: George W. Gillemot, Santa Monica, Calif.

[73] Assignee: John T. Thompson, Los Angeles, Calif. ; a part interest

[22] Filed: Apr. 29, 1974

[21] Appl. No.: 465,073

[52] U.S. Cl. ............................... 339/198 G; 174/41
[51] Int. Cl.² .......................................... H01R 9/00
[58] Field of Search..... 339/198 R, 198 G, 198 GA, 339/198 H, 103 R, 103 M, 125 R, 218 R, 218 M, 263 R; 211/26, 89; 248/310, 313, 316 R; 174/41

[56] References Cited
UNITED STATES PATENTS

| | | | |
|---|---|---|---|
| 2,891,101 | 6/1959 | Koliss.............................. | 174/41 X |
| 3,032,740 | 5/1962 | Von Hoorn..................... | 339/103 R |
| 3,160,280 | 12/1964 | Burch ................................ | 211/89 |
| 3,275,969 | 9/1966 | Sheeran ......................... | 339/103 R |
| 3,427,553 | 2/1969 | Smulowitz et al........... | 339/103 R X |
| 3,576,520 | 4/1971 | Stauffer ......................... | 339/198 G |
| 3,728,668 | 4/1973 | Reinisch ........................ | 339/198 G |

*Primary Examiner*—Roy Lake
*Assistant Examiner*—James W. Davie
*Attorney, Agent, or Firm*—Harris, Kern, Wallen & Tinsley

[57] ABSTRACT

A conductor terminal block and a mounting member therefor having provision for detachably holding one or more blocks snugly but detachably assembled to one or both faces of the mounting member. As shown, each block includes a pair of threaded studs to which conductors can be clamped. The one-piece mounting member is molded of resilient non-conductive material and includes a pair of resilient latches to which a respective terminal block can be snugly assembled. A tool serves to deflect the latches and release any block independently of the others. The conductor terminal connecting capacity is readily expandable upon need by adding one or more terminal blocks and one or more terminal block mounting members.

3 Claims, 4 Drawing Figures

SNAP-IN, SNAP-OUT TERMINAL BLOCK AND MOUNTING MEMBER THEREFOR

This invention relates to conductor terminal blocks, and more particularly to an improved block construction and to a mounting member therefor to which one or more blocks can be snapped into assembled position when and as needed to meet operating requirements.

The use of electrical equipment of a wide variety of types presents a need for expandable terminal block accessories to which the ends of conductors can be securely but separably joined together. In this manner, different sub-assemblies can be readily interconnected or separated from one another for replacement and servicing. Initially, a given installation may have need for only a limited number of terminal blocks. Expansion of the equipment or the addition of other subassemblies or auxiliaries necessitates expansion of the terminal block facilities.

Various proposals have been made heretofore to meet these and the like requirements, but these are subject to various shortcomings and deficiencies avoided by the improved construction constituting the present invention. For example, prior terminal facilities utilize blocks of complex design having numerous parts requiring assembly and manipulation. Likewise the supports heretofore provided for multiple terminal blocks are subject to serious shortcomings. For example, the individual blocks are not readily added or removed without first detaching other blocks in the assembly whereas those mounting facilities having this capability are subject to other disadvantages.

In view of the foregoing shortcomings and deficiencies of prior constructions, there is provided by this invention a simple, rugged, one-piece terminal block and a simple, rugged, one-piece mounting member to which one or several of the blocks can be quickly assembled by snap-in, snapout retainers. Typically, the mounting member is designed to hold three terminal blocks against each of its opposite faces. Each block is held snugly and securely in place irrespective of the number of blocks present at any time. The terminal block, molded from non-conductive material, includes a pair of latch accommodating openings whereas the one-piece molded mounting member includes a pair of resilient latch members snugly seatable against the detent surfaces of the block. When one or more blocks are in assembled position they are held firmly against movement in all directions until and unless a manipulating tool is applied to the latches to release them.

Accordingly, it is a primary object of the present invention to provide an improved simplified conductor terminal block adapted to be held assembled to a mounting member by cooperating resilient latches.

Another object of the invention is the provision of a one-piece terminal block in which a pair of threaded conductive studs are embedded and including integral keeper lugs for the conductors and detent surfaces engageable by resilient latching tangs.

Another object of the invention is the provision of a one-piece terminal block mounting member having provision for the snap-in, snap-out retention thereon of one or more terminal blocks against one or both faces thereof.

Another object of the invention is the provision of a terminal block mounting member molded in one piece and including integral threaded studs for securing the mounting member to a support.

These and other more specific objects will appear upon reading the following specification and claims and upon considering in connection therewith the attached drawing to which they relate.

Referring now to the drawing in which a preferred embodiment of the invention is illustrated:

Figure 1:
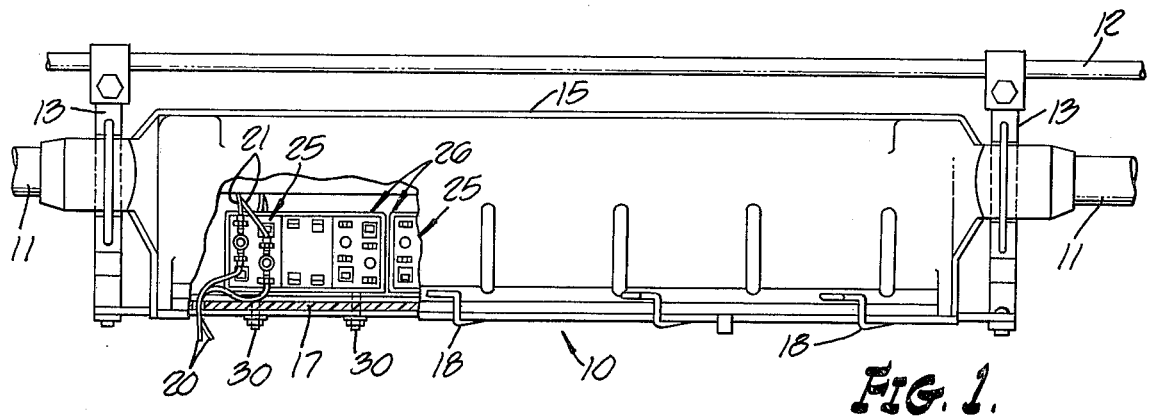
FIG. 1 is a side elevational view showing a cable splice assembly utilizing the invention terminal block and mounting member therefor to interconnect conductors of the main cable to service cables.

Referring initially more particularly to FIG. 1, there is shown an illustrative embodiment of the invention in a typical one of its many operating environments. This operating environment comprises a ready access cable splice facility, designated generally 10, as used in large numbers to interconnect groups of customer telephone service cables to a main telephone cable. In accordance with conventional practice, the main cable 11 is suspended from a messenger cable 12 by means including the brackets 13,13 at the opposite ends of the ready access splice facility 10. For a more detailed description of this splice facility reference may be had to U.S. Pat. No. 3,654,584, granted to George W. Gillemot and John T. Thompson on Apr. 4, 1972. Such an assembly includes a supple split tubular housing 15 of inverted U-shape in cross-section. This housing embraces the splice connections and adjacent portion of the cable entering the splice assembly, its longitudinal lower edges being formed with grooves 16 snugly embracing the base 17 of the splice housing. The sides of housing 15 are held assembled to the edges of base 17 as by spring clips 18 or by other suitable means.

The phone subscriber service cable comprises a pair of conductors 20 which must be separably connected in circuit with a pair of main cable conductors 21. Since it is frequently necessary to change the pair of main cable conductors connected to a particular subscriber for one reason or another, it is undesirable to make a permanent splice between service cable conductors 20,20 and the main cable conductors 21,21. Instead, the ends of each conductor are provided with a terminal lug 40 which is clamped to one of the threaded studs of the invention terminal block in a manner which will be described presently.

The invention terminal block, designated generally 25, as here shown, comprises a rectangular thick block of non-conductive material. A generally rectangular mounting member, designated generally 26, has provision for supporting three of these blocks against each of its opposite faces or a total capacity of six terminal blocks. It will be understood that the mounting member can be designed to accommodate a smaller or a larger number of blocks as desired.

Mounting member 26 is molded in one piece from suitable high-strength, tough, resilient, plastic material. Its main body comprises a thin web 28 surrounded by a peripheral flange 29 projecting from either face of web 28. This flange has a height somewhat less than the thickness of blocks 25. Molded integral with and projecting from one longitudinal side of the mounting member are a pair of threaded studs 30 for use in securing the mounting member to some support. As here shown, studs 30 extend through the base 17 of the splice housing and are anchored to this member by nuts 31.

Figure 2:
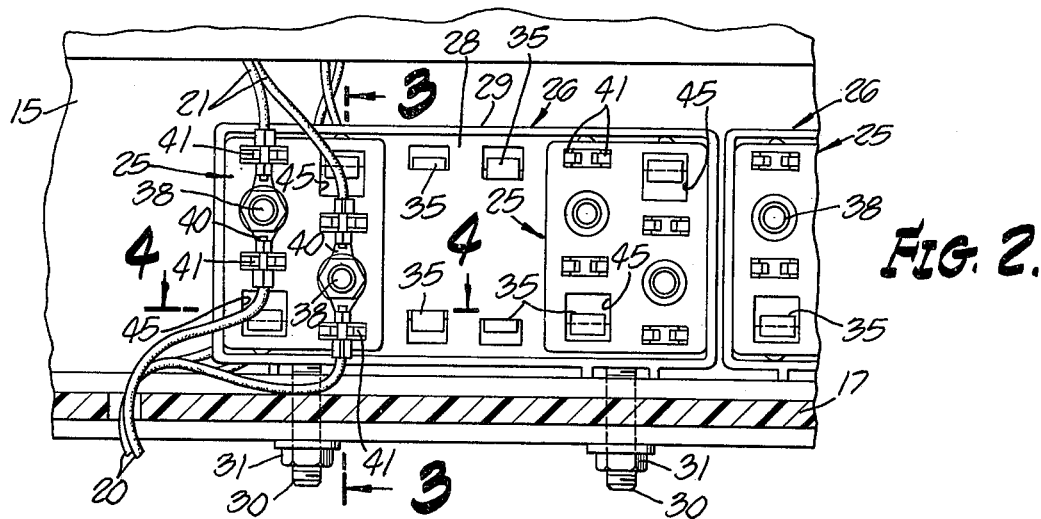
FIG. 2 is a fragmentary view on an enlarged scale of the invention.

Projecting outwardly from the opposite sides of web 28 are two rows of L-shaped latching tangs 35,35. The tangs in each row are not directly opposite one another but those in one row are located between those in the opposite row on the same face of the mounting member. Thus, referring to FIG. 2 and to the terminal block 25 at the right hand end of mounting member 26, it will be noted that the two latching tangs 35 holding that block to the mounting member are located in diagonally opposite corners of the block. This design serves a purpose which will become apparent presently in connection with a description of the blocks. It will be noted that the shorter legs at the outer ends of the tangs lie generally parallel to web 28 but that the inner surface of the shorter legs are acutely inclined to the plane of the web and serve as camming surfaces for a purpose to be explained presently.

Each terminal block 25 is molded in one piece from suitable high strength resilient non-conductive material, such as a suitable plastic. Each comprises a rectangular thick main body having a pair of conductor clamping studs 38,38 projecting from one face with their base ends fixedly embedded in the block. These studs are located along a diagonal line between a pair of opposite corners. Stated differently, studs 38 are offset to either side of both median bisectors of the block. Each stud is provided with a clamping nut 39 for clamping the terminal lugs 40,40 of conductors 20 and 21 to the studs.

Figure 3:
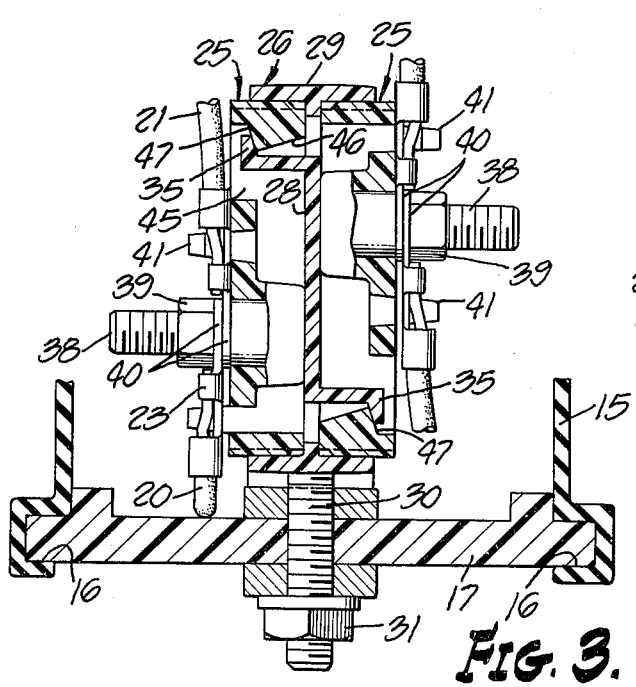
FIG. 3 is a cross-sectional view on an enlarged scale taken along line 3—3 on FIG. 2.
Figure 4:
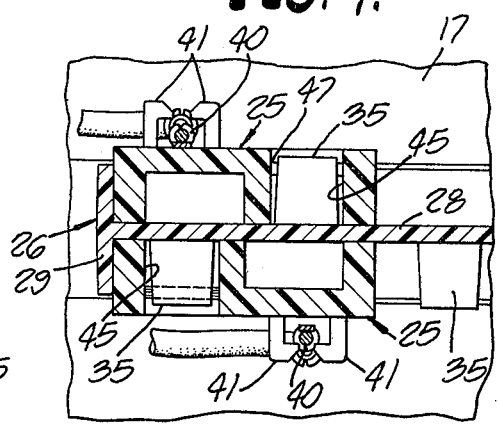
FIG. 4 is a cross-sectional view on an enlarged scale taken along line 4—4 on FIG. 2.

Referring more particularly to FIGS. 3 and 4, it will be understood that each of the terminal blocks preferably includes pairs of keeper conductor lugs 41,41 projecting outwardly from the outer face of the block. Keeper lugs 41 are L-shaped and resilient and cooperate in holding a conductor and its terminal lug 41 against rotation about the axis of studs 38. It will be understood that the gap between the shorter legs of keepers 41 is somewhat less than the diameter of the terminal lug or the conductor to be held captive. The outer corners of these shorter legs are bevelled and aid in flexing the keepers away from one another as the conductor is pressed downwardly past the ends of the shorter legs. Once the conductor is pressed past these shorter legs the keepers resume their normal position and hold the conductor captive until forcibly withdrawn. It will be observed that there are a pair of keeper lugs 41 on the diametrically opposed sides of each of studs 38.

Each terminal block includes a pair of diagonally opposed openings 45 passing entirely through the block and each accommodating one of the latching tangs 35. Openings 45 are slightly wider than the width of the tangs 35 and each has a specially designed ledge or detent surface engageable with the shorter leg of these tangs, the details of this surface being best shown in FIG. 3. Each opening 45 has an inclined sidewall 46 engageable with the end of the shorter leg of the latching tangs to deflect these tangs while a mounting block is being assembled to mounting member 26. Each also includes an inclined detent surface 47 complemental to the adjacent inclined surface of the shorter leg of tangs 35. When engaged, these two surfaces lock the block in assembled position and snugly seated against web 28 of mounting member 26.

From the foregoing description it will be evident that any desired number of mounting members 26 may be secured to any suitable supporting member by studs 30 and clamping bolts 31. Each mounting member accommodates six terminal blocks any one of which may be assembled to or removed from the mounting member independently of any other block. The assembly operation is accomplished simply by aligning the openings 45 of a selected block with a related pair of locking tangs 35. The terminal block is telescoped over this pair of tangs and pressed toward web 28 of the mounting member. As this occurs the tangs 35 are deflected by camming surfaces 46 until the shorter legs of these tangs can snap into locking engagement with the inclined detent surfaces 47. The block is now firmly assembled and, as is clear from FIGS. 3 and 4, held securely against movement in any direction. Any block may be removed by deflecting the tangs out of seating engagement with detent surfaces 47. For example, the bit of a screwdriver can be inserted against the end of the shorter leg of the tang and twisted or pivoted in a direction to disengage each of a pair of the latches whereupon the block can be lifted away from the mounting member.

While the particular snap-in, snap-out terminal block and mounting member therefor herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

I claim:

1. A terminal block having a foursided generally cubical main body of non-conductive material,
   a pair of threaded studs fixed thereto and projecting from one face thereof adjacent a respective diagonally related first pair of corners of said main body,
   a pair of openings through said main body positioned inwardly of the sides thereof and adjacent a diagonally related second pair of corners of said main body,
   said openings each having a detent surface below said one face and facing outwardly and adapted to seat a latching tang entering the opening from the face opposite said one face to hold said terminal block detachably assembled with said oppposite face snugly against a mounting member for said terminal block, and
   nut means on each of said threaded studs for holding a conductor assembled to each of said studs,
   said pair of studs and said pair of openings being symmetrically positioned on said one face such that said terminal block has the same mounting configuration when upside down whereby said terminal block may be mounted on said mounting member in a first upright position and in a second reversed position.

2. A terminal block as defined in claim 1 characterized in that the main body of said terminal block includes pairs of closely spaced L-shaped conductor keepers molded integral with said main body, said keepers being resilient and provided with hooked ends deflectable away from one another as a conductor is pressed therebetween and thereafter cooperating to hold the conductor captive.

3. A terminal block as defined in claim 2 characterized in that said main body is provided with separate pairs of said L-shaped keepers located close to the diametrically opposed sides of each of said studs.

* * * * *